INVENTOR:
EDGAR KUHN

United States Patent Office

3,517,296
Patented June 23, 1970

3,517,296
VOLTAGE CONTROL CIRCUIT FOR A-C GENERATOR SUBJECT TO WIDELY VARYING DRIVE SPEEDS
Edgar Kuhn, Gerlingen, Germany, assignor to Robert Bosch G.m.b.H., Stuttgart, Germany, a limited-liability company of Germany
Filed June 6, 1967, Ser. No. 643,912
Claims priority, application Germany, June 15, 1966, B 87,561
Int. Cl. H02m 7/20; H02j 7/10
U.S. Cl. 321—5                                                              15 Claims

ABSTRACT OF THE DISCLOSURE

An oscillator circuit, preferably a blocking oscillator or monopulse oscillator controls the trigger impulse for a group of SCR rectifiers, one for each phase of a three-phase automotive-type generator; control of the blocking oscillator is obtained from sawtooth wave generators, one each connected to a phase and added to an error signal comparing actual output voltage and a reference, so that the oscillator will oscillate during predetermined times of each phase, thus triggering an SCR during such time of each phase, as the sawtooth wave rises during each cycle, and, at a predetermined phase position within each cycle, begins to exceed the reference value.

---

The present invention relates to a control arrangement for alternating current generators, and more particularly to a control circuit to maintain constant an output potential, derived from a three-phase alternating current permanent magnet field generator connected to an automotive engine.

Control circuits, including semi-conductor rectifiers to rectify alternating current output from an alternating current generator connected to the engine of an automotive vehicle, are known. Since the speed of the drive engine varies widely, the output potentials of these generators may also vary from between 10 to 200 volts unless special control circuits are provided to maintain this output potential constant. When alternating current generators are used in the electrical system of automotive vehicles, severe requirements are placed on the generator. Britsh Pat. 1,045,287, assigned to the assignee of the present invention, illustrates an arrangement in which power transistors are used as rectifiers in each phase of a multi-phase generator. One blocking oscillator is provided to control all of the power transistors. This control is effected in dependence on the potential at the load side of the generator. If the potential at the load side is too low, the blocking oscillator is switched into the circuit and the transistors become conductive; if the potential is too high, the blocking oscillator remains switched out and power transistors are blocked. This arrangement is satisfactory; however, difficulties have been experienced if permanent magnet generators have been used and the speed of rotation becomes very high, so that likewise the frequency rises.

Generators using permanent magnets are of several types. The so-called Alnico magnets have a high magnetic induction. It is not necessary to use special magnetic pole pieces therewith and the magnetic circuit does not require much iron. If oxyde-type magnets are used, however, for example barium oxyde magnets, a higher energy is obtained although they operate with a lower induction. These oxyde type magnets are cheaper and preferred for certain applications. It is, however, necessary to use pole pieces or other flux guides. The thus increased quantity of magnetic material in the magnetic circuit increases the inductivity at the output winding of the generator. When semi-conductor rectifiers of the controlled rectifier type, such as silicon controlled rectifiers (SCR) are used, then, at high speeds of the generator difficulty with switching off the rectifiers has been experienced. Ordinarily, the SCR's are switched off when the current therethrough goes through zero or null. Due to the inductance of the output windings, however, this may not occur when the speed of the generator rises to a high value so that a controlled rectifier may remain conductive although the blocking oscillator is no longer oscillating. Thus, at high speeds, the controller will be unable to switch off the controlled rectifier even though the controlled rectifier was not to remain conductive, or become conductive at the next cycle. The rectifier which remains conductive thus carries at all times the output current of the generator, and that current must be delivered by only one of the phase windings. This current overloads the particular, conductive SCR and the respective phase winding. Also, it rapidly increases the direct current potential at the output of the rectifier, overloads the vehicle battery and may even destroy it.

It is therefore an object of this invention to provide a voltage control circuit for a multiphase permanent magnet alternator using controlled output rectifiers of the semiconductor type which is capable of operating at elevated frequencies.

It is a further object of this invention to provide such a voltage control circuit in which load current is equally divided among the various phase-windings.

It is a further object of this invention to provide such a voltage control circuit for use with a permanent magnet alternator using oxyde-type magnets and having a relatively high inductance of its output windings.

It is a further object of this invention to provide a voltage control circuit which will be economical to manufacture and which will fit into the housing of an alternator.

It is still a further object of this invention to provide such a voltage control circuit for an alternator which circuit will operate for both directions of rotation of the alternator.

SUMMARY OF INVENTION

Briefly, in accordance with the present invention, a voltage control circuit is provided in which an oscillator circuit, such as blocking or mono-pulse oscillator is connected to control the control electrode of a controlled rectifier; and the phasing of the On-Off time of the oscillator is controlled in accordance with the start of each cycle of the generator. By controlling the oscillator in phase relation with respect to the beginning of the generator cycles, the voltage control circuit can be rapidly and effectively controlled and over-voltage conditions from the generator avoided.

A controller, in accordance with the present invention, can be built from small, readily available components and made sufficiently compact to be incorporated into the housing of the generator. The regulation is sufficiently close so that transistorized equipment, such as taxi call or other mobile communication equipment, is not damaged by any over-voltages. Further, the generator may be connected to run in either direction, without necessitating any changes in the controller therefor; this is an advantage when the controller is assembled with automotive vehicles, since their maintenance may be entrusted to insufficiently skilled personnel.

If the generator is a multi-phase generator, for example a three-phase generator, then the output windings thereof are connected to a multi-phase rectifier, in which each one of the phases has a controlled semi-conductor rectifier associated therewith. A separate trigger oscillator is provided for each one of the controlled rectifiers, that is, for each one of the phases, and the On-Off time of each one of the oscillators is controlled with respect to the phasing of the beginning of each cycle of each particular phase voltage.

Such an arrangement provides for excellent regulation of the output potential; integrated circuits can readily be used, physically located in the generator. The load distribution on all phases is even and overloading of a particular phase, and thus possible damage to one of the phase windings is avoided. This enables the rectifiers and output windings to be closely dimensioned, with only a very small safety factor, while still providing protection to load equipment as well as to the customary battery.

The regulator according to the present invention is preferably provided with a voltage-sensitive relay shunting one of the controlled rectifiers of one phase to provide initially for potential for the control circuit even if the battery should be disconnected. This provides for high output voltage of the generator even on manual starting of the engine.

The structure, organization, and operation of the invention will now be described more specifically in the following detailed description with reference to the accompany drawings, in which.

Figure 1:
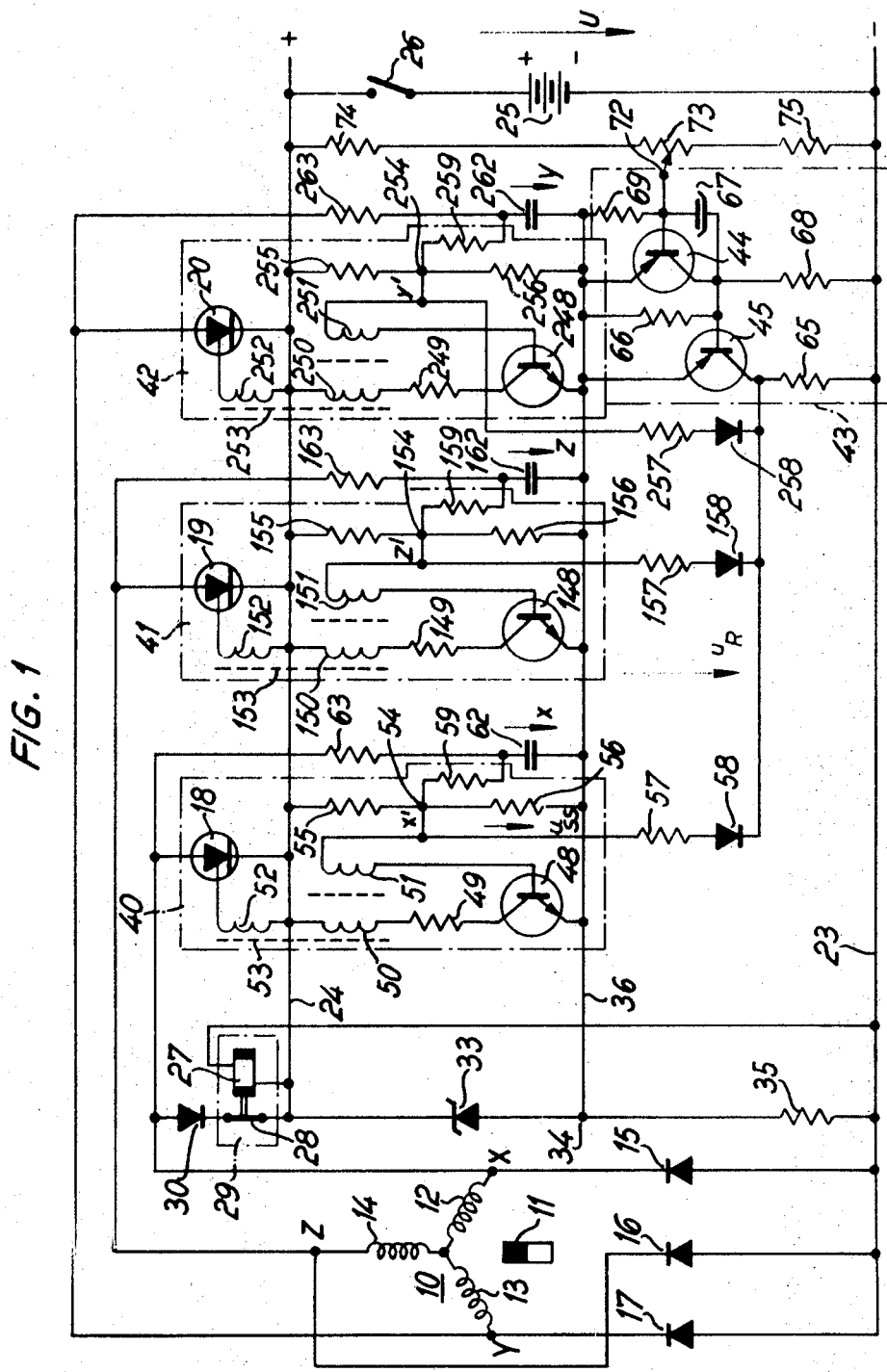
FIG. 1 is a schematic circuit diagram of a control circuit for a permanent magnet generator.

Referring now to the drawings and particularly to FIG. 1: A three-phase generator, schematically indicated at 10, has a permanent magnet rotor, schematically indicated at 11. Three Y-connected output windings 12, 13, 14 are connected to phase terminals X, Y, Z. The output terminals of phases X, Y, Z are connected to a rectifier, which consists of six rectifier elements in a bridge network. The cathodes of three rectifiers 15, 16 and 17 are connected to the anodes of controlled rectifiers 18, 19 and 20, which are in the form of controlled switches such as SCR's. The anodes of the rectifiers 15, 16 and 17 are interconnected, and together are connected to the negative bus 23. The cathodes of controlled rectifiers 18, 19, 20 are connected to the positive bus 24. Buses 23, 24 together form a D-C network, connected to a battery 25 over a switch 26. Further loads, not shown, are connected to the positive and negative buses 23, 24. The winding 27 of the relay 29, having normally closed contacts 28 is likewise connected across buses 23, 24. The contacts 28 are connected in series with a diode 30 and across the anode-cathode or power path of one of the controlled rectifiers, as shown in FIG. 1 across SCR 18. The voltage sensitivity of winding 27 is so arranged that when normal, operating voltage is present on buses 23, 24, the relay is pulled in and the contacts 28 are open. Diode 30 is connected in the same polarity as controlled rectifier 18.

A reference potential circuit is provided, formed of a Zener diode 33 and a resistance 35, series-connected across buses 23, 24. The junction 34, between Zener diode 33 and resistance 35 is connected to a reference bus 36. Zener diode 33 serves as a source of reference potential, so that the potential on line 36 is always more negative than the potential of positive bus 24 by a certain, predetermined value.

Three blocking oscillators 40, 41, 42 control the SCR's 18, 19, 20. The blocking oscillators 40, 41, 42 are identical; only the blocking oscillator 40 will be described in detail; the components in blocking oscillators 41, 42 corresponding to the blocking oscillator 40 are similar and reference numerals are the same except that they have been incremented by 100 and 200, respectively. Each one of these blocking oscillators becomes effective once during each cycle of any one phase of the generator 10. The time of oscillation, that is the On-time depends on the potential between buses 23, 24 and commences sooner, or later, with respect to the beginning of each cycle. If the potential between buses 23, 24 is high, the blocking oscillator becomes effective only a substantial period of time after the beginning of each cycle—or will not become effective at all; if the potential between the buses 23, 24 is low, the blocking oscillators may start to oscillate immediately at the beginning of a cycle of the respective phase.

Control of the On-Off time of the blocking oscillator is obtained from the D-C amplifier 43, containing an input transistor 44 and an output transistor 45, both of the p-n-p type.

Blocking oscillator 40 includes a n-p-n transistor 48 which simultaneously serves as a comparator. The emitter of transistor 48 is connected directly to reference bus 36. Its collector is connected over a collector resistance 49 to a winding 50 of a transformer schematically indicated at 53, and then to the positive bus 24. The base of transistor 48 connects to a second winding 51 of transformer 53; the other terminal of winding 51 connects to a junction point 54.

Junction 54 is connected to an intermediate point of the voltage divider formed of resistance 55 (for example, 3,300 ohms) and resistance 56 (1,000 ohms) both connected across buses 24 and 36. Further, junction 54 is connected over a decoupling resistance 57 and a diode 58 to the collector of transistor 45, which is the output of D-C amplifier 43. Further, junction 54 is connected to an R-C timing network consisting of a resistance 59 (1,000 ohms) and then to one electrode of a condenser 62, the other electrode of which connects to reference bus 36, as well as to a resistance 63 (15,000 ohms), the other side of which connects to the terminal X of one of the phase windings, as shown winding 12 of generator 10. Likewise, blocking oscillator 41 has a condenser 162 and a resistance 163 connecting to terminal Z of winding 14; and blocking oscillator 42 has a condenser 262 connected over a resistance 263 with terminal Y of the output winding 13. Junction point 154 of oscillator 41 is connected over a resistance 157 and a diode 158 to the collector of transistor 45 and, similarly, oscillator 42 has its junction point 254 connected over a resistance 257 and diode 258 with the collector of transistor 45.

The collector of transistor 45 connects over its collector resistance 65 to negative bus 23; its emitter is connected directly with line 36 and its base directly to the collector of input transistor 44, and then over a resistance 66 with the reference bus 36. The emitter of input transistor 44 is directly connected to the reference bus 36; its collector is connected to one terminal of a condenser 67, as well as to a collector resistance 68 and then to the negative bus 23; the other terminal of condenser 67 connects with the base of transistor 44. The base of transistor 44 is further connected to a resistance 69 and then to bus 36 as well as to a tap point 72 of a potentiometer 73 which, together with resistances 74, 75, is connected as a voltage divider across the negative and positive buses 23, 24.

Let it be assumed that a potential U of 12.6 v. exists between the negative and positive buses 23, 24 and that the normal Zener voltage of diode 33 is 8 v. If the potential of the reference bus 36 is considered zero, then bus 24 has, with respect to reference bus 36, a potential of +8 v.; negative bus 23 then has a potential of —4 v. approximately. The tap of potentiometer 73 is then so adjusted that its potential is the same as that of reference bus 36, when the potential U between the negative and positive buses 23, 24 has its normal or desired value. When this condition obtains, input transistor 44 is just still blocked, since it will not have any base current. As a result, a strong current can flow over resistance 68 and thus over the base of transistor 45, so that transistor 45 will be highly conductive. As a result, the collector of transistor 45 will have a potential just barely under that of bus 36, that is, the potential $u_R$ between reference bus 36 and the collector of the transistor 45 is almost zero. Transistor 45 thus serves as a phase inversion stage.

If the potential U between buses 23, 24 increases over its desired value, then tap 72 will become negative with respect to line 36 so that the input transistor 44 becomes conductive, and the potential between its emitter and its collector will decrease from, let it be assumed, 0.6 v. to 0.2 v. Similarly, the voltage between emitter and base of the output transistor 45 will decrease and the collector current in transistor 45 will decrease. This has the effect that the voltage $u_R$ between its emitter and its collector increases, and proportionately as the potential U increases above its desired value.

If the potential U decreases below its desired value, tap 72 will become positive with respect to bus 36, so that the input transistor 44 remain blocked, whereas output transistor 45 is fully conductive and the potential $u_R$ is equal to zero.

It can be seen that thus the D-C amplifier 43 delivers an error potential, or signal, which is approximately proportional to the deviation of the output potential from a desired value.

Figure 2:
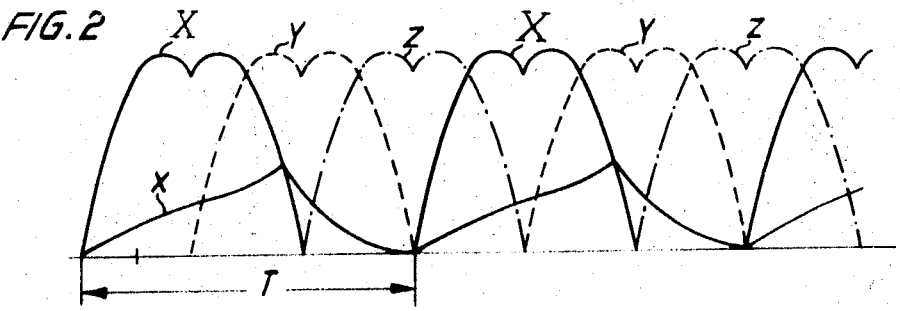
FIGS. 2 to 4 are schematic diagrams useful in connection with the explanation of the function of the circuit.

FIG. 2 illustrates at X the wave shape obtained when an oscilloscope is connected between a phase X of the output winding 12 and one of the output lines 23, or 36 supplied by the multi-phase bridge rectifiers 15 to 20. As can be seen, the wave shape of the so-obtained potential is closer to a square wave than to a sine wave. Further, during one-third of the cycle of the generator, the value of this potential is zero. Condenser 62 is connected to the potential illustrated by the wave X in FIG. 2, over resistance 63. When the potential X is positive, condenser 62 is charged over resistance 63, which will result in a voltage $x$ (FIG. 2) across the condenser 62. This potential, $x$, increases until the potential at the condenser is equal to that applied thereacross; during the time when the potential applied to the condenser becomes less, or zero, the condenser discharges. The entire period of one cycle is indicated in the diagram of FIG. 2 by T. Discharge of the condenser 62 is over resistances 59, 56.

As seen in FIG. 2, the potential shown at $x$ is approximately that of a sawtooth wave. It has been found from experience that the highest generator frequency which can be expected in an ordinary automotive type generator of current design is approximtely 1,000 Hz., which means a shortest period of one cycle of one msec. Considering the shortest period T of one msec., then the charging time constant of charging resistance 63 and condenser 62 are chosen to have a maximum charging time of two msec. This results in a resistance 63 of about 15K ohm, and a value of 0.15μf. for condenser 62. The discharge time constant can then preferably be chosen as 0.3 msec., that is shorter than the shortest time of one cycle; resistances 56 and 59 can then be each 1,000 ohms.

When the output of D-C amplifier 43 is zero, and no potential is applied to condenser 62 over resistance 63 from the phase winding of the generator, then a positive potential is applied by means of voltage divider 55, 56 to junction 54 and thus over winding 51 of transformer 53 to the base of transistor 48 (and transistors 148, 248 similarly) with respect to reference bus 36. In this case the blocking oscillator 40 is in oscillating condition: first, its collector current rises which induces a voltage in winding 51, increasing the positive potential of the base of the transistor 48. When transistor 48 begins to saturate, no further potential is induced in winding 51, its base becomes more negative, the collector current decreases, which induces a potential of reverse polarity in winding 51 which, now, rapidly drives the transistor 48 to blocking direction. This action repeats; at the same time a potential is induced in winding 52 and controlled rectifier is triggered to become conductive as soon as a positive potential is applied to its anode.

Figure 3:
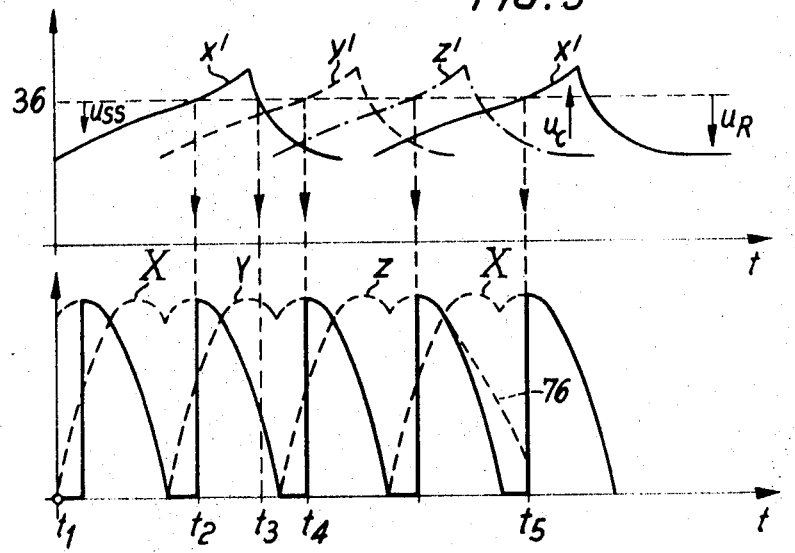

If the potential U between buses 23, 24 is larger than the desired value, then the potential $u_R$ has a value which is larger than zero, as previously discussed. This condition is illustrated in FIG. 3, in which the potential of reference bus 36 is schematically indicated by line 36. The potential of the junction point 54 is illustrated at $x'$; the potential at junction 154 is shown at $z'$; and the potential at junction 254 is shown at $y'$. These potentials, in each instance, illustrate the addition of the potential $u_R$ and the sawtooth potentials $x$, $y$, $z$, derived from the phases X, Y, Z, which of course are in synchronism with the phases as previously discussed. The sawtooth potentials $x$, $y$, $z$ are similar and are phase shifted by 120°.

Potential $u_R$ is applied to the junction 54 over the adding and coupling resistance 57, the potential $x$ is applied to junction 54 over resistance 59. Resistance 56, which acts as a summing resistance, thus has a derived voltage thereon, forming the sum of the voltages $(u_R + x)$, which sum is illustrated in FIGS. 1 and 3 with $u_{ss}$. This voltage is equal to the potential difference betwen potential 36 of line 36 and a potential $x'$ of the junction 54 (or the potentials $z'$, $y'$ with respect to junctions 154, 254 respectively).

The condition of the circuit, as illustrated in FIG. 3, is that the potential U has increased beyond its desired value. At time $t1$, the phase voltage X (see the lower row of FIG. 3) begins to become positive. The potential $x'$ at junction 54 is negative with respect to the potential of line 36. Thus, the base of transistor 48 is more negative than the emitter; this causes the transistor to remain blocked until the time $t2$, at which time the potential $x'$ at junction 54 becomes more positive than the potential at line 36. As soon as the base of transistor 48 becomes more positive than its emitter, it becomes conductive, a collector current starts to flow and the oscillator circuit starts to oscillate, causing a sharp current pulse to be applied by the transformer 53 to the control electrode of controlled rectifier 18, thus firing rectifier 18. Controlled rectifier 18 immediately becomes fully conductive, and carries current in accordance with the heavy line shown in the lower row of the diagram of FIG. 3; this current will be carried until its anode becomes more negative than its cathode.

Blocking oscillator 40 will oscillate only until the period of time $t3$, at which time the potential $x'$ becomes more negative than the potential of line 36. It should be noted that time $t3$ is in advance of the end of the full cycle of the generator.

The above-described action will be repeated with the blocking oscillator 42 as soon as potential $y'$ on junction 254 becomes more positive than the potential at line 36 thus causing oscillator 42 to oscillate and render controlled rectifier 20 conductive as seen in FIG. 3, lower diagram, at t4. A similar action, of course, will obtain with rectifier 19, controlled by the blocking oscillator 41.

At high speeds it may occur that, due to the inductivity of the output windings 12, 13, 14 and substantially current through the controlled rectifier 18, 19, 20, the current has not yet reached zero although the potential at the anode of the rectifiers is already negative with respect to the potential of the cathode. This condition is illustrated in FIG. 3, lower row, by the dashed curve portion 76. The circuit according to the present invention is not affected by this inductance, since at the very latest time indicated at t5 (FIG. 3-lower diagram) rectifier 18 becomes conductive and this rectifier will then have transferred the current from the previously conductive rectifier 19 (dashed curve 76) so that rectifier 19 can extinguish immediately.

Figure 4:
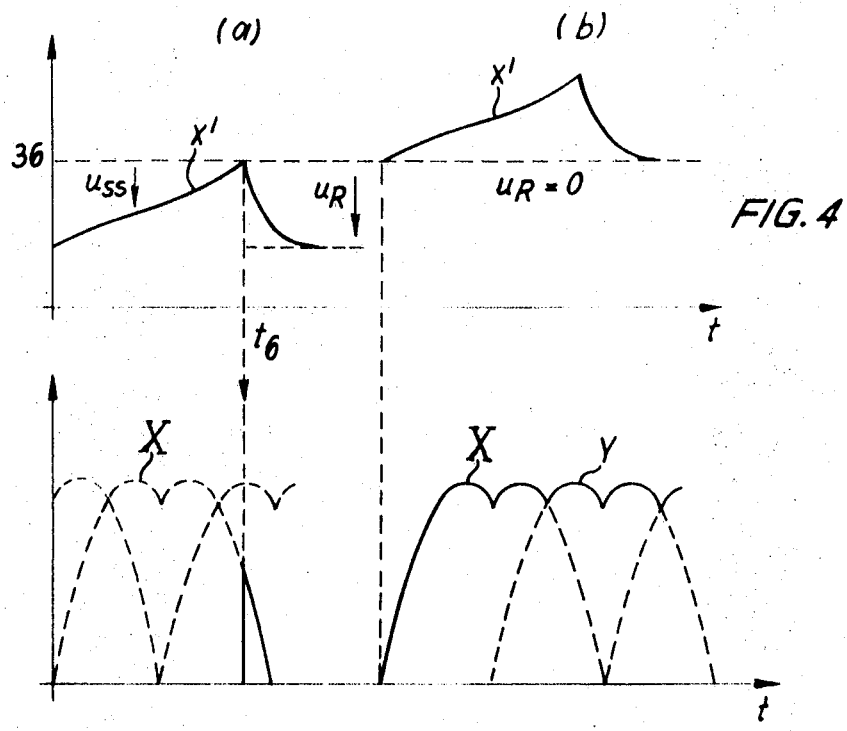

If the output potential rises still more, the phase angle at which the controlled rectifier fires increases even more and more. FIG. 4 illustrates, with respect to one phase only, in diagrammatic form the relationships of the various potentials superimposed in FIG. 3 for all phases, as the output potential changes.

The curves under (a) indicate the potential $x'$, and the current through the rectifiers (lower diagram) with high output potential. The phase angle after which firing occurs increased with increasing output voltage. Only a very small current will flow through the controlled rectifiers, which can readily be switched off even at high speeds, and even if the subsequent rectifier does not take on any further current because it, itself, is being controlled towards cut off. Thus, continuous conductivity of a controlled rectifier, even in the absence of an applied anode potential is avoided, thus also avoiding overloading of the battery or damage to it or connected loads, such as transistorized communication equipment.

FIG. 4(b) illusrates the condition when the output potential of the generator U has decreased below its desired value. Potential $u_R$ then becomes zero, controlled rectifier 18, 19, 20 becomes fully conductive, and three oscillators 40, 41, 42 are oscillating constantly.

Relay 29 bridges the controlled rectifier 18 in order to provide a potential between the negative and positive buses 23, 24 in the absence of a battery. This potential is pulsating, but it enables oscillation of oscillators 40 to 42 and thus proper functioning of the controlled rectifiers 18, 19, 20. As soon as a potential is obtained between the buses 23, 24, which may be for example ten percent less than the desired value of output potential U, the relay winding 27 pulls in contact 28, thus breaking the shunt connection with respect to the rectifier 18, previously established over contact 28 and diode 30. If it is desired to operate the controller without a battery 25, a large condenser of for example 4,000μf. must be used in its place so that the effective value of the potential, and the arithmetic average thereof are approximately equal.

Figure 5:
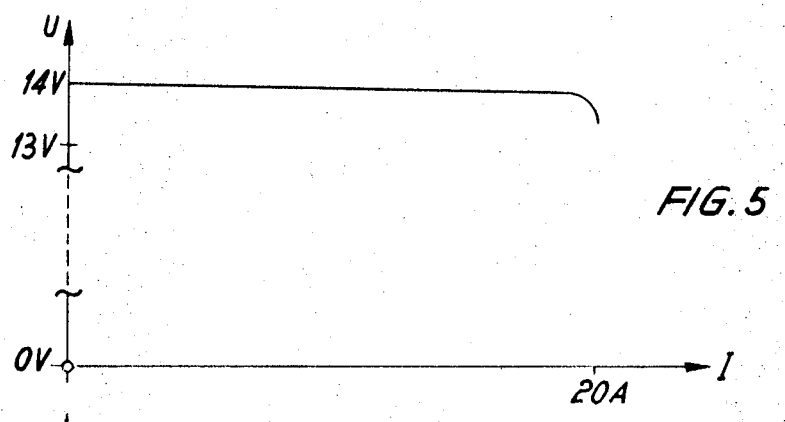
FIG. 5 is a voltage (ordinate) versus current (abscissa) curve illustrating the regulating effectiveness.

The control results obtained with the controller according to the present invention are shown in FIG. 5. The curve, as illustrated, is valid for all generator speeds. As can be seen, deviations of output potential from a desired value, shown as 14 v. in the figure, are very small and are in the order of 0.2 v.

Figure 6:
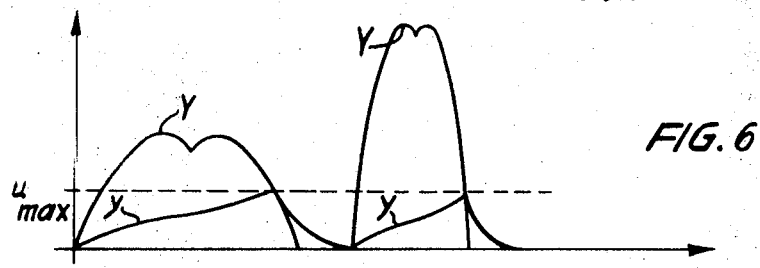
FIG. 6 illustrates the charging-time relationships of a condenser at low and high frequency.

FIG. 6 illustrates the dependence of the sawtooth wave y on frequency, with respect to the phase Y. The diagram at the left illustrates a low frequency condition; at the right a condition of double the frequency of the diagram at the left. In each instance, a permanent magnet generator is used, running idly, that is, without supplying a load, so that the output potential is its loaded value. In both instances, condenser 262 is charged to approximately the highest potenial $u_{max}$. The time for charging of the condenser, at the higher frequency is only half as long as the charging time at the lower frequency; however, the output potential is doubled, so that the potential $u_{max}$ is about the same. Utilizing this effect enables the use of a very simple circuit, as illustrated, to provide a phase angle controller for a three-phase generator, even though the output frequency may vary widely. As seen, the direction of rotation of the generator, even in a multi-phase generator, is irrelevant, since rectification by means of the bridge rectifier 15–20 is independent of phase sequence and the wave forms of the sawtooth wave $x$, $y$, $z$, are likewise independent of the direction of rotation and of phase sequence. Thus, a generator and controller combination according to the present invention can be used with a drive rotating the generator in either direction, clockwise or counter-clockwise.

Figure 7:
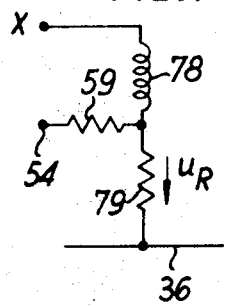
FIG. 7 is a partial circuit diagram showing a modification of FIG. 1.
Figure 8:
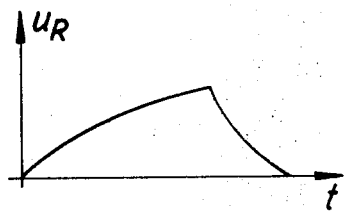
FIG. 8 is a curve illustrating the charging-time relationship of the circuit of FIG. 7.

FIG. 7 illustrates a modification, in which the R-C network consisting of condenser 62 and resistance 63 is replaced by an inductance 78 connected to phase (shown as phase X in FIG. 7), in series with a resistance 79 connected to reference bus 36. Resistance 59, as in the circuit of FIG. 1, then connects the inductance-resistance network formed of inductance 78 and resistance 79 to junction 54. The other two phases are similarly connected. Since the current through inductance 78 will have a sawtooth form, the potential $u_R$ across resistance 79 will rise in sawtooth fashion and be utilized instead of the potential $x$ across condenser 62, as previously discussed.

The blocking oscillators 40, 41, 42 need supply only comparatively small amounts of power. Transformers 53, 153, 253 thus only require very small windings which can be readily placed next to the electronic components within the housing of a generator, even if the entire circuit is built up in conventional manner with printed circuitry. Use of integrated circuits permits further miniaturization.

Instead of the use of a blocking oscillator, as described in particular in connection with the operation of FIG. 1, the coils of the transformer and the circuit parameters can be dimensioned so that the transistor 48, in combination with the coils and other circuit elements form a monopulse oscillator, having the same essential effect as a blocking oscillator. As an equivalent thereto, a mono-stable multi-vibrator can also be used, which is of sufficiently strong power capacity to provide an output pulse capable of firing controlled rectifiers 18, 19, 20. If a mono-stable multi-vibrator is used, the transformer 53 can be dispensed with and replaced by a coupling condenser, so that a further miniaturization of the circuit can be obtained.

Diodes 58, 158, 258 are isolating diodes in order to prevent cross coupling of the oscillators 40, 41, 42 with respect to each other. It is thus possible to utilize a single D-C amplifier 43 and avoid the cost of construction and components for three separate sources of error signal.

The phase angle control of the present invention is particularly adapted to control a multi-phase generator, preferably a three-phase generator, subject to greatly varying input drive speeds and thus having equally greatly varying output frequencies. It is particularly adapted with such a generator utilizing permanent magnets, such as, for example, barium oxyde magnets having high inductivity in its output windings.

What is claimed is:

1. A voltage control circuit to maintain a constant output voltage of a polyphase alternator adapter to be driven at widely varying drive speeds, including a plurality of controlled rectifiers (18, 19, 20) for converting A-C power supplied from the alternator to D-C power, comprising an error detector means (43) providing a D-C output error signal ($u_R$) depending on the deviation of the D-C output voltage from a desired value;

means (62, 63; 162, 163; 262, 263) for obtaining from said alternator a group of separate A-C signals, said A-C signals being phase-shifted with respect to each other and synchronized with the output voltage of the alternator;

a plurality of combining means (57; 157; 257) connected to superimpose the D-C output error signal ($u_R$) of the error detection means (43) and the respective A-C signal to obtain a plurality of composite control signals ($x'$, $y'$, $z'$), each comprising a D-C component ($u_R$) and an A-C component ($x$, $y$, $z$) synchronized with the output voltage of the polyphase alternator;

a controlled voltage source (36);

an oscillator circuit (40, 41, 42) for each controlled rectifier connected to be supplied by said controlled voltage source, each oscillator being connected to be responsive to the application of a respective combined control signal thereto when said combined control signal attains, with respect to the voltage of said source, a predetermined value to provide trigger pulses, the oscillators being further connected to provide said trigger pulses to the respective rectifiers;

and connecting means connecting a combining means, each, to an oscillator circuit, each.

2. Control circuit as claimed in claim 1, wherein said means deriving said group of A-C signals comprises sawtooth wave generators, each including an R-C network (62, 63; 162, 163; 262, 263), each connected to a respective phase of said alternator.

3. Control circuit as claimed in claim 1, wherein said means deriving said group of A-C signals comprises sawtooth wave generators each including an inductance (78) and resistance (79) network (FIG. 7), each connected to a respective phase of said alternator.

4. Control circuit as claimed in claim 1 including a voltage-sensitive relay (29) having its coil (27) connected across the output of the generator (10) and a pair of normally closed contacts (28) serially connected to a rectifier (30) said rectifier-contact series connection bridging at least one controlled rectifier element (18), said rectifier (30) being poled like said controlled rectifier element (18); and the voltage sensitivity of said relay coil (27) being adjusted to open said relay when the potential of said generator exceeds a predetermined value.

5. Control circuit as claimed in claim 1 wherein said means (62, 63; 162, 163; 262, 263) deriving said group of A-C signals includes signal generating means connected to each phase of the alternator, and the composite signals including the A-C signals derived from the phases of the alternator control, respectively, the controlled rectifiers which are associated with like phases of the alternator.

6. Control circuit as claimed in claim 5 wherein said controlled rectifiers are part of a bridge rectifier (15–20), an inductance-resistance network FIG. 7; (78, 79) is provided to generate said sawtooth wave, said L-R network including a series connected inductance and resistance connected to one side to the respective phase (X, Y, Z) of the output of the generator (10) and on the other to an output (36) of said bridge rectifier.

7. Control circuit as claimed in claim 5 wherein said controlled rectifiers are part of a bridge rectifier (15–20) an R-C network (62, 63; 162, 163; 262, 263) is provided to generate said sawtooth wave, said R-C network including a load resistance (63, 163, 263), a condenser (62, 162, 262) and a discharge circuit (56, 59; 156, 159; 256, 259), each of said R-C networks being connected on one side to the respective phase (X, Y, Z) of the output of the generator (10) and on the other with an output (36) of the bridge rectifier.

8. Control circuit as claimed in claim 1 wherein said A-C signal has a wave form of approximately sawtooth shape, each signal of the group being derived from a respective phase of the alternator and in synchronism therewith, and providing a slowly changing first part and a rapidly changing second part; said sawtooth wave form signal and said output signal of the error detector means being combined to control the operation of the associated oscillator.

9. Control circuit as claimed in claim 8 wherein the time duration of the slowly changing portion of such sawtooth wave is in the order of the time of one cycle of the generator at the highest generator frequency when said generator is in operation.

10. Control circuit as claimed in claim 8 wherein the time duration of the rapidly changing portion of said sawtooth wave is in the order of approximately ten to fifty percent of the time duration of the slowly changing part of said sawtooth wave.

11. Control circuit as claimed in claim 1 wherein said controlled voltage source (36) includes a Zener diode (33);

and said error detector means includes comparator means (44) connected to both said source (36) and to a potential representative of the output of the generator (72, 73, 74, 75).

12. Control circuit as claimed in claim 11 wherein said means generating separate A-C signals comprises a sawtooth wave generator, each, connected to said controlled voltage source (33, 36).

13. Control circuit as claimed in claim 11 wherein said comparator means comprises a first transistor 44 having one of its control electrodes connected to a terminal of said source of reference potential (36) and another control electrode connected to the potential proportional to the output of said generator (72, 73, 74, 75) and further including a phase inversion stage (45) connected to such first transistor (44) and a decoupling diode (58, 158, 258) interconnecting the output of said phase inversion stage (45) with each of said comparator circuits (48, 148, 248).

14. The combination of a three-phase A-C permanent magnet generator subject to widely varying drive speeds and supplying direct current to a load, with a voltage control circuit to maintain the output potential of said generator constant, comprising a plurality of controlled rectifiers (18, 19, 20), at least one each connected to a phase of said generator connected in circuit from said generator to said load and rectifying the output from said generator, each rectifier having a control electrode;

three oscillator circuits (40, 41, 42) one for each phase, generating trigger impulses connected to the control electrodes of respective, associated controlled rectifiers to control the rectifiers to become conductive at a predetermined phase angle with respect to each cycle of the generator;

means controlling the on-off time of said oscillators (40, 41, 42), said means including a first circuit deriving a plurality of first signals ($x$, $y$, $z$) each providing a time reference and varying, in synchronism with the potential of each phase of the generator ($x$, $y$, $z$);

a second circuit deriving an error signal ($u_R$) proportional to deviation of rectified output potential of the generator with respect to a reference value;

circuit means combining said first signals ($x$, $y$, $z$) individually, and said error signal ($u_R$) to obtain combined signals ($x'$, $y'$, $z'$) having a component varying in synchronism with the potential of a respective phase of the generator and a component representative of said error signal;

a source of potential (36) connected to supply said oscillator circuits;

said means comparing (48, 148, 248) said combined signal ($x'$, $y'$, $z'$) with the voltage of said source and connected to cause oscillation of said oscillators at the time when the result of the comparison exceeds a predetermined value, whereby the on-off time of each of said oscillators and thus the period of conduction during each positive cycle of a phase of said controlled rectifier is governed by the instantaneous value of said combined signal ($x'$, $y'$, $z'$) with respect to the source (36).

15. The combination of claim 14, wherein said first circuit includes a sawtooth wave generator.

References Cited
UNITED STATES PATENTS

| | | |
|---|---|---|
| 2,596,606 | 5/1952 | Scherer. |
| 3,262,046 | 7/1966 | Clarke et al. |
| 3,264,548 | 8/1966 | King. |
| 3,315,141 | 4/1967 | Wright et al. |
| 3,320,512 | 5/1967 | Kruger _____ 321—64 X |
| 3,327,195 | 6/1967 | Mason _____ 321—16 X |
| 3,329,883 | 7/1967 | Frierdich _____ 321—5 |
| 3,351,843 | 11/1967 | Tipton _____ 322—28 |
| 3,432,725 | 3/1969 | Rotch _____ 321—5 X |

J D MILLER, Primary Examiner

W. H. BEHA, Jr., Assistant Examiner

U.S. Cl. X.R.

320—39; 321—18, 28, 47; 322—28, 89